(12) United States Patent
Conroy (10) Patent No.: US 7,344,638 B2
(45) Date of Patent: Mar. 18, 2008

(54) FILTER GRID ASSEMBLY

(75) Inventor: Jay Ryan Conroy, Clearwater, FL (US)

(73) Assignee: Hydro-Dyne Engineering, Inc., Clearwater, FL (US)

( * ) Notice: Subject to any disclaimer, the term of this patent is extended or adjusted under 35 U.S.C. 154(b) by 164 days.

(21) Appl. No.: 11/374,678

(22) Filed: Mar. 14, 2006

(65) Prior Publication Data

US 2007/0215539 A1    Sep. 20, 2007

(51) Int. Cl.
  *E02B 5/08* (2006.01)
  *B01D 33/056* (2006.01)
(52) U.S. Cl. .................. 210/160; 210/232; 210/400
(58) Field of Classification Search ............ 210/232, 210/400, 160
  See application file for complete search history.

(56) References Cited

U.S. PATENT DOCUMENTS

| | | | |
|---|---|---|---|
| 4,597,864 A | * | 7/1986 | Wiesemann ............... 210/160 |
| 4,812,231 A | | 3/1989 | Wiesemann |
| 5,102,536 A | | 4/1992 | Wiesemann |
| 5,618,415 A | * | 4/1997 | Johnson, Jr. ............... 210/158 |
| 5,788,839 A | * | 8/1998 | Gargan et al. ............. 210/160 |
| 5,800,701 A | * | 9/1998 | Larsen ...................... 210/158 |
| 6,177,020 B1 | | 1/2001 | Wiesemann |
| 6,669,854 B1 | | 12/2003 | Wiesemann |

* cited by examiner

Primary Examiner—Thomas M. Lithgow
(74) Attorney, Agent, or Firm—Larson & Larson; Ruth E. Freeburg (57) ABSTRACT

A filter apparatus separates fine particles such as pine needles, threads, hairs and seeds from a liquid influent. A rotating grid assembly has multiple grid sections mounted by top-to-bottom connected links, supporting a filter media having specified openings sufficient for entrainment of miniscule particles. Grid sections are interchanged for collection and discharge of various sized particles using the same apparatus.

24 Claims, 12 Drawing Sheets

FIG. 12

FILTER GRID ASSEMBLY

FIELD OF THE INVENTION

This invention relates to a grid assembly for filtering particles from water or other liquid mixtures for which filtering a volume of 100 gallons per minute up to 100 million gallons a day is needed. More particularly, it refers to an improved filtering apparatus with replaceable grids for filtering large volumes of liquid influent.

BACKGROUND OF THE INVENTION

Prior art of U.S. Pat. No. 4,812,231, owned by this assignee, has resulted in improvement of removing solid particles from a liquid influent by providing a cost effective apparatus, utilizing a rotating filter assembly with a flushing device mounted so as to discharge the debris that accumulates, greatly decreasing the need for manpower with respect to cleaning and removal of the unwanted particles. U.S. Pat. No. 5,102,536, an improvement over the rotating filter assembly, further improved the removal of solid particles from liquid influents by utilizing a projecting foot on link members mounted on the rotating filter so as to complete the break up of solids, such as fecal matter, that were not always broken up and discharged by the prior art assemblies. Further prior art of U.S. Pat. No. 6,177,020 and U.S. Pat. No. 6,669,854, also owned by this assignee, describes an alternative means of filtering waste streams containing solids by the use of a stepping screen assembly with a grid structure of bars. Multiple parallel alternate static and dynamic bars are driven by a pneumatic cylinder, lifting solids out of a liquid waste stream. Each bar has multiple vertically spaced apart shelves at a right angle to the vertical axis of the bar. The solid material moves upwards and over the top of the grid structure to fall by gravity onto a conveyor for delivery of the solids to a waste receptacle while the liquid moves through the grid structure without impediment.

Though these inventions provide an improvement over prior filtering methods, unwanted particles such as pine needles, textile threads, hair, seeds and other similarly sized debris are not removed using the present methods found in the prior art. These miniscule particles fall back into the filtered liquid influent. The mesh screens found in current filter assemblies cannot be supported if the openings are less than two millimeters in diameter. Miniscule particles such as pine needles, textile threads, hair or seeds are, therefore, not filtered by current screen assemblies. In addition, the assemblies for collection and discharge of large sized debris cannot be used for removal of smaller particles and vice versa, as the filter grids are not easily interchangeable. An improvement is needed that will support grids with smaller openings, allowing removal of these smaller unwanted particles in an efficient and cost effective manner, while still allowing interchangeability of filter grids to allow for easy maintenance and variation in the grid opening size within the same apparatus.

SUMMARY OF THE INVENTION

The present invention overcomes the problem of smaller particles passing through openings of the grids of filtering assemblies in the prior art, while at the same time allowing interchangeable grids for a cost effective means of removing all solids from liquid influents.

The invention is directed to an improved filter grid section, utilizing links having a slot opening of length sufficient to accommodate insertion of filter media grids having specified openings, within the slot opening in each link. The additional support provided by the links encasing the grid sections allows for the use of a filter media of stainless steel cloth, polymer mesh, perforated stainless steel plates or an equivalent, having grid openings of less than two millimeters in diameter. In particular, the present invention allows stainless steel cloth, or alternatively polymer mesh or perforated stainless steel plate, with openings as small as 0.25 millimeters in diameter, to be used as a filter grid for removal of unwanted particles. The grid is supported by links; the longitudinally connected links support a filter grid assembly for entraining miniscule debris particles on the filter media and on the surface of the links to be carried upward as the links rotate. The particles are unloaded and discharged from the filter grid during the rotation of the system. Furthermore, the grid sections may be interchanged with grid sections having different sized openings for versatility within the same filter apparatus.

BRIEF DESCRIPTION OF THE DRAWINGS

The invention is best understood by those having ordinary skill in the art by reference to the following detailed description when considered in conjunction with the accompanying drawings in which.

DETAILED DESCRIPTION OF THE INVENTION

Throughout the following detailed description, the same reference numerals refer to the same elements in all figures.

Figure 1:
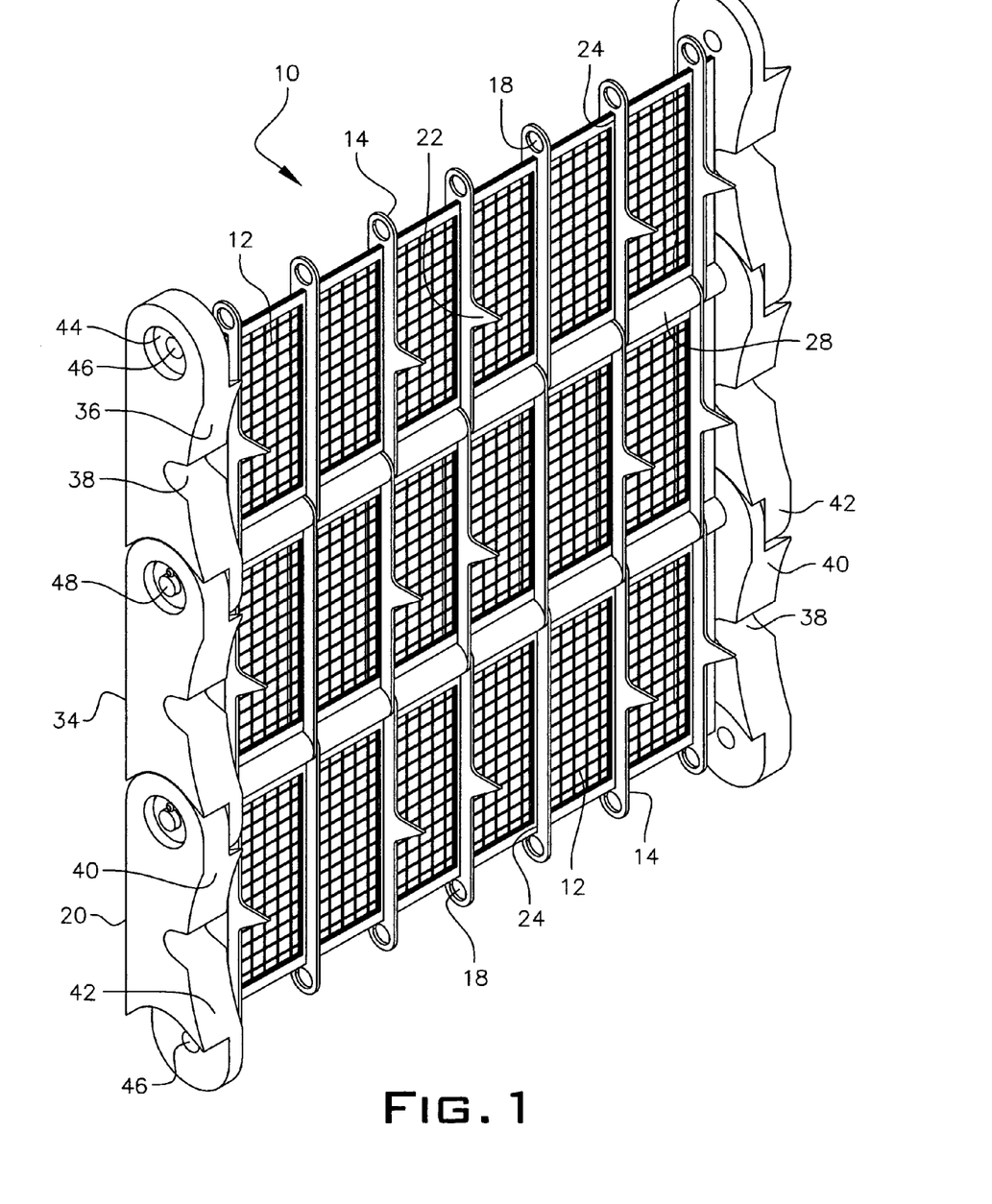
FIG. 1 is a perspective view of three grid sections of a grid assembly with openings in a filter media of polymer mesh or stainless steel cloth.
Figure 2:
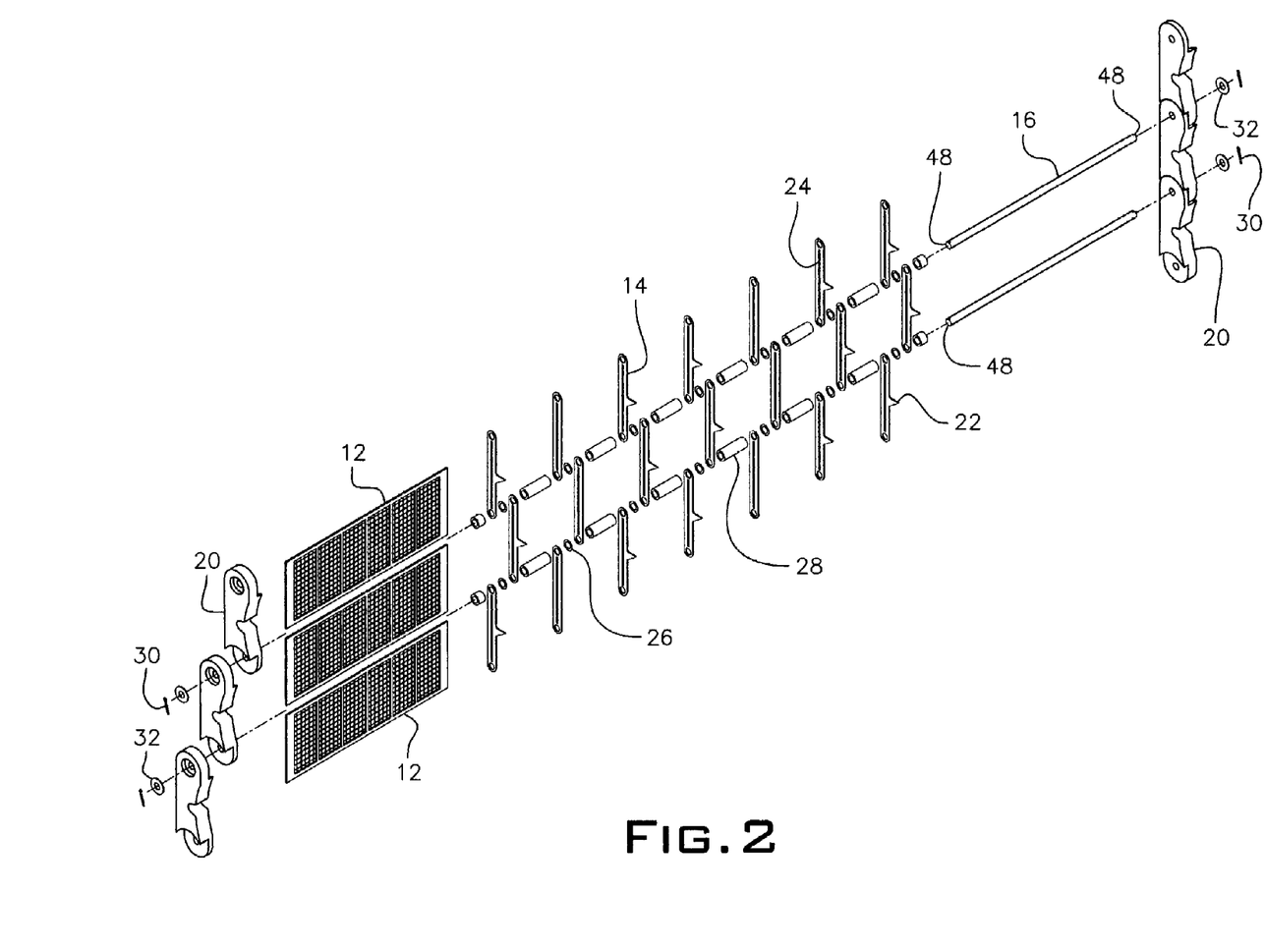
FIG. 2 is an exploded view of the three grid sections viewed in FIG. 1.

Referring to FIGS. 1 and 2, the improved filter grid assembly 10 is formed by multiple grid sections 12, each grid section 12 supported by links 14 of stainless steel, or alternatively a suitable alloy or a polymer, each link mounted vertically on grid shafts 16 which fit through bore holes 18 on each end of individual links 14. The grid shafts 16 are preferably made of stainless steel and connect the links 14 to drive elements 20 on each side of the grid sections 12. Spikes 22, protruding outwardly from some or all links 14, entrain additional debris for discharge.

Each link 14 contains a slot 24 through which a grid section 12 is inserted as shown in FIG. 2. A link washer 26, made from a polymer, is placed between the links 14 for reduction of friction while a link spacer 28, made from a polymer, is placed between links 14 to accommodate variation in space between links 14 on each grid section 12. The range of space between links 14 is ½ inch to five inches with about three inches preferred.

Figure 4:
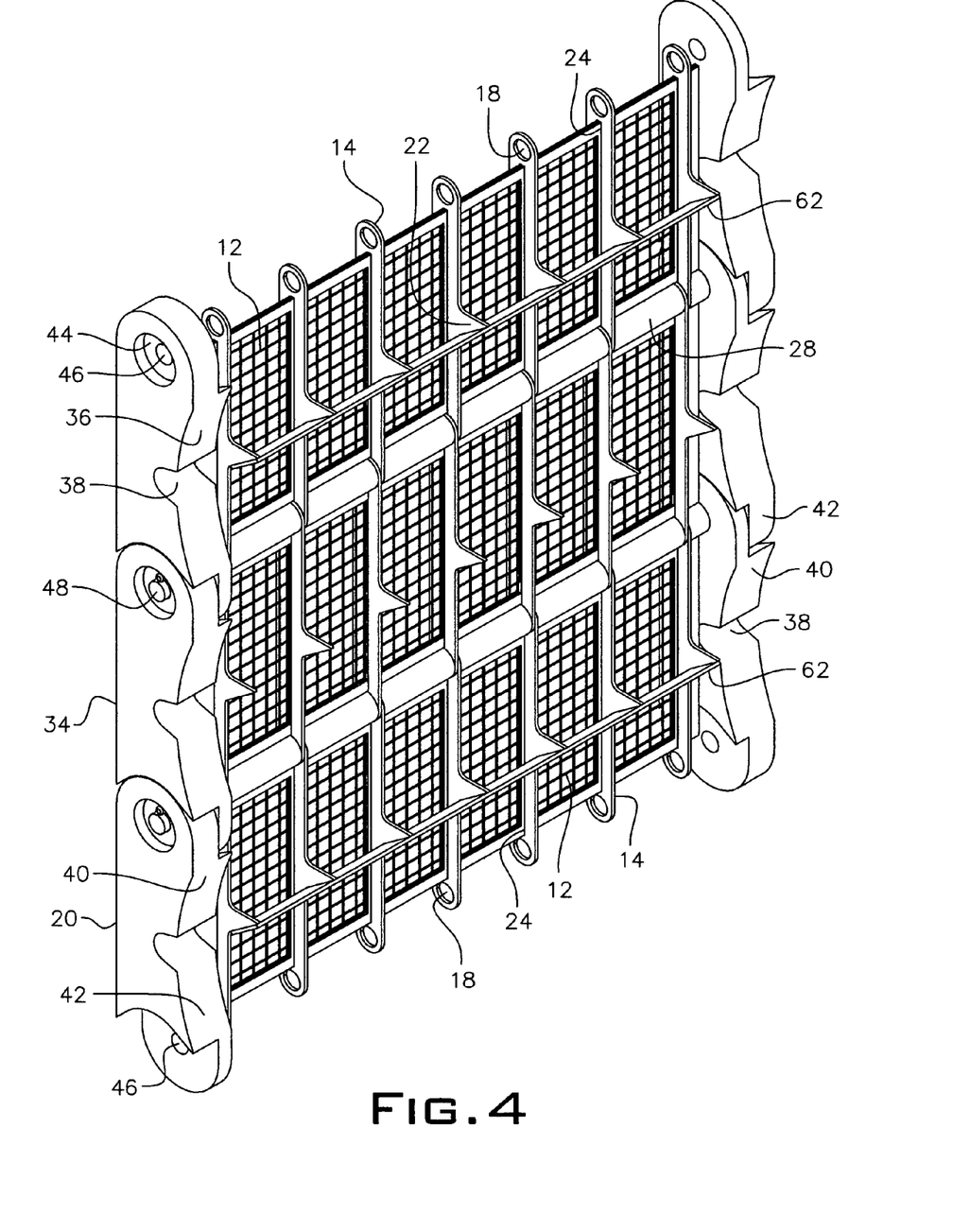
FIG. 4 is a perspective view showing three grid sections of a grid assembly, as seen in FIG. 1 with a catch shelf attached to the protruding spikes on two of the grid sections.
Figure 5:
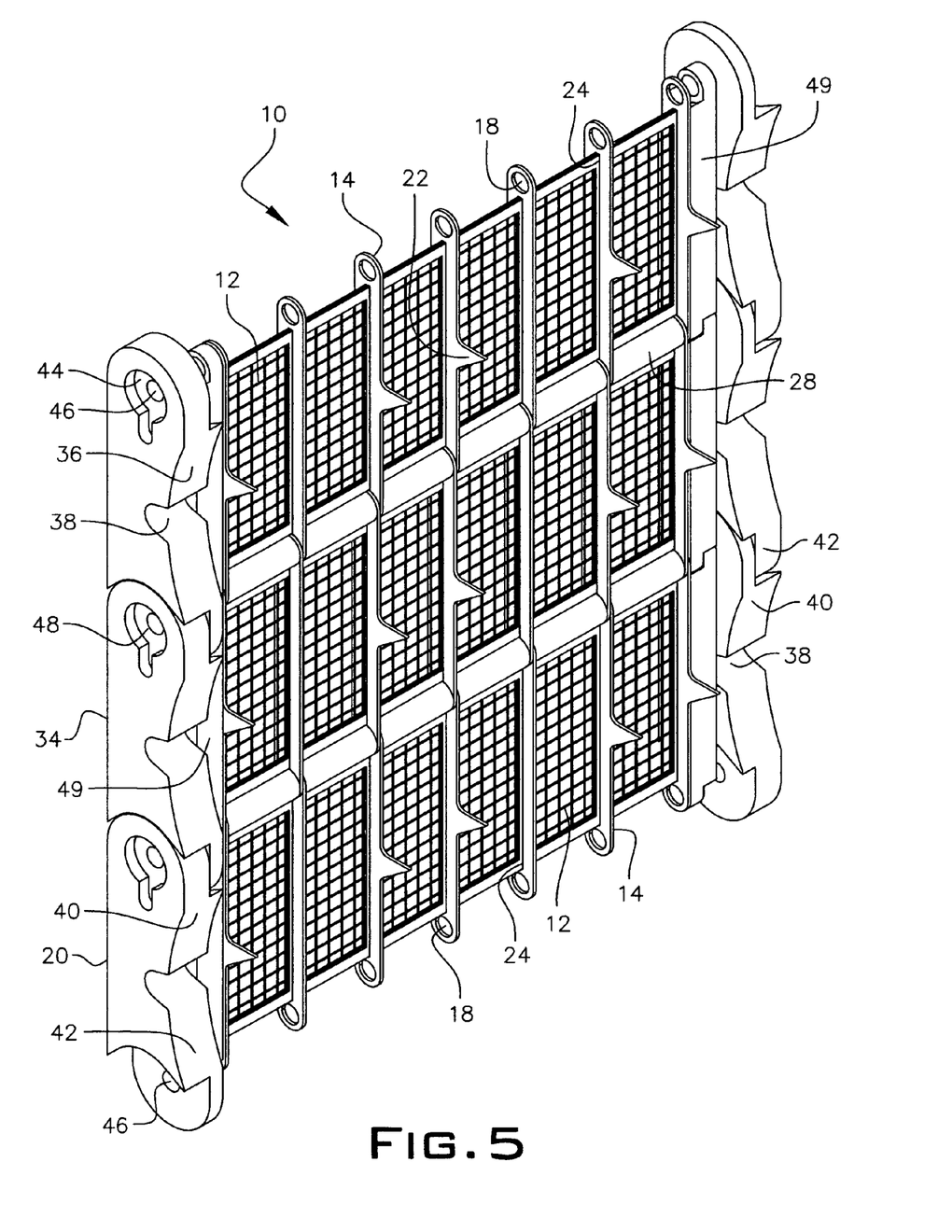
FIG. 5 is a perspective view showing three grid sections of a grid assembly, as seen in FIG. 1 with an end cap located between each drive element and corresponding grid section.
Figure 6:
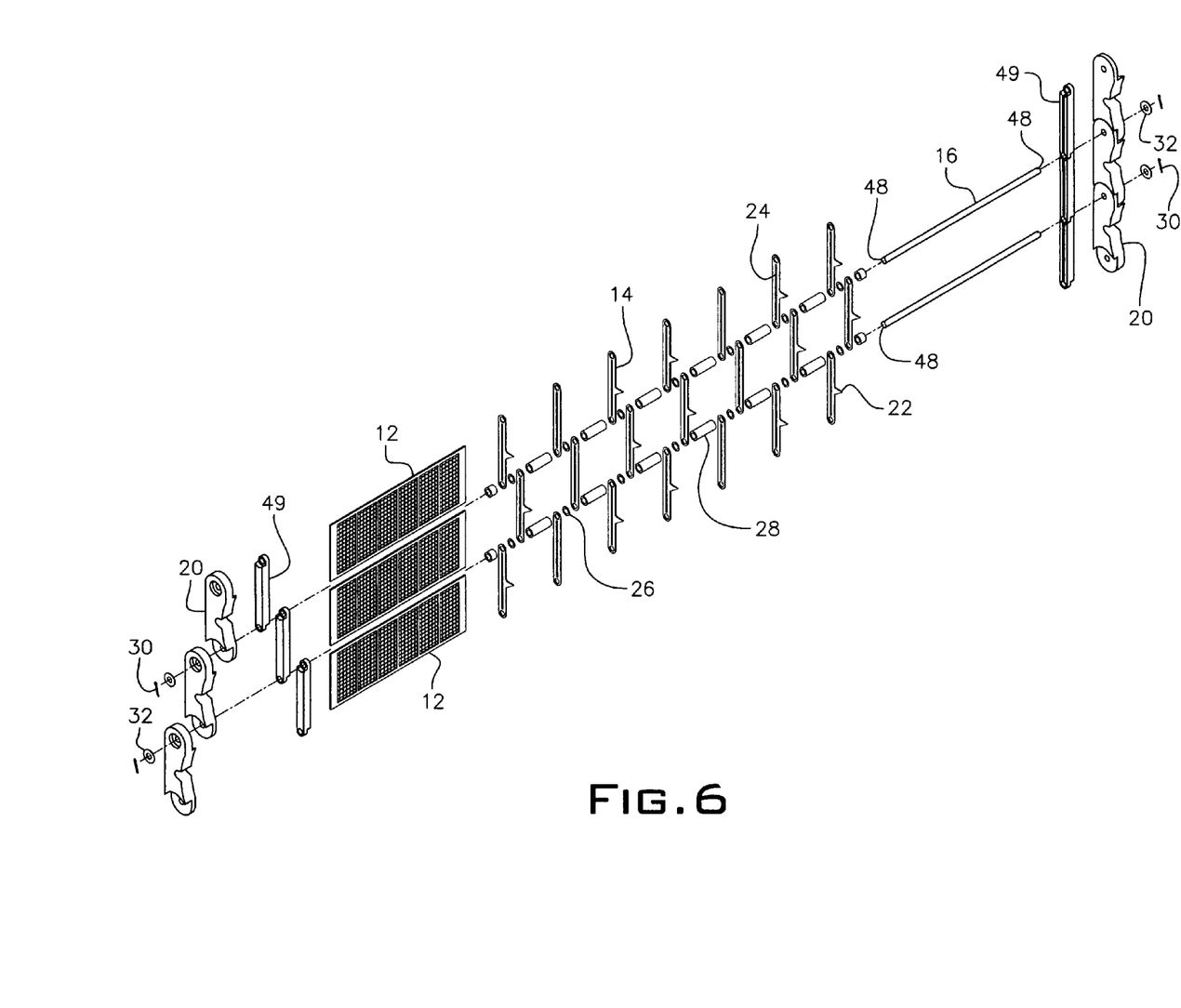
FIG. 6 is an exploded view of the three drive elements with end caps, as shown in FIG. 5.

As shown in FIG. 2, each grid section 12 is capped on each side by a gear tooth engaging drive element 20. The drive elements 20 are preferably made of a high strength polymer with a means for fastening 30, such as a cotter pin, nut, snap pin or other known fastener, and a washer 32, made from stainless steel or alternatively a suitable alloy, placed at each end of grid shaft 16 to secure the drive element 20 in place adjacent each grid section 12. Each drive element 20 has an outside surface 34 and an inside surface 36 containing a notch 38, shown in FIGS. 1 & 4. A first end portion 40 and a second end portion 42 of the drive element 20 is located on each side of the notch 38. The end portions 40 and 42 have a recess 44 in the drive element 20. A through bore 46 is located at the center of each recess 44 for insertion of the grid shaft 16 ends 48. The drive element 20 forms an endless elliptical loop that is the grid assemblies 10 and 10a, shown in FIGS. 8 and 11. In one embodiment, an end cap 49 is located between a drive element 20 and a grid section 12 as shown in FIGS. 5 and 6. The end cap 49 further prevents smaller debris from falling between the drive element 20 and grid section 12.

Figure 3:
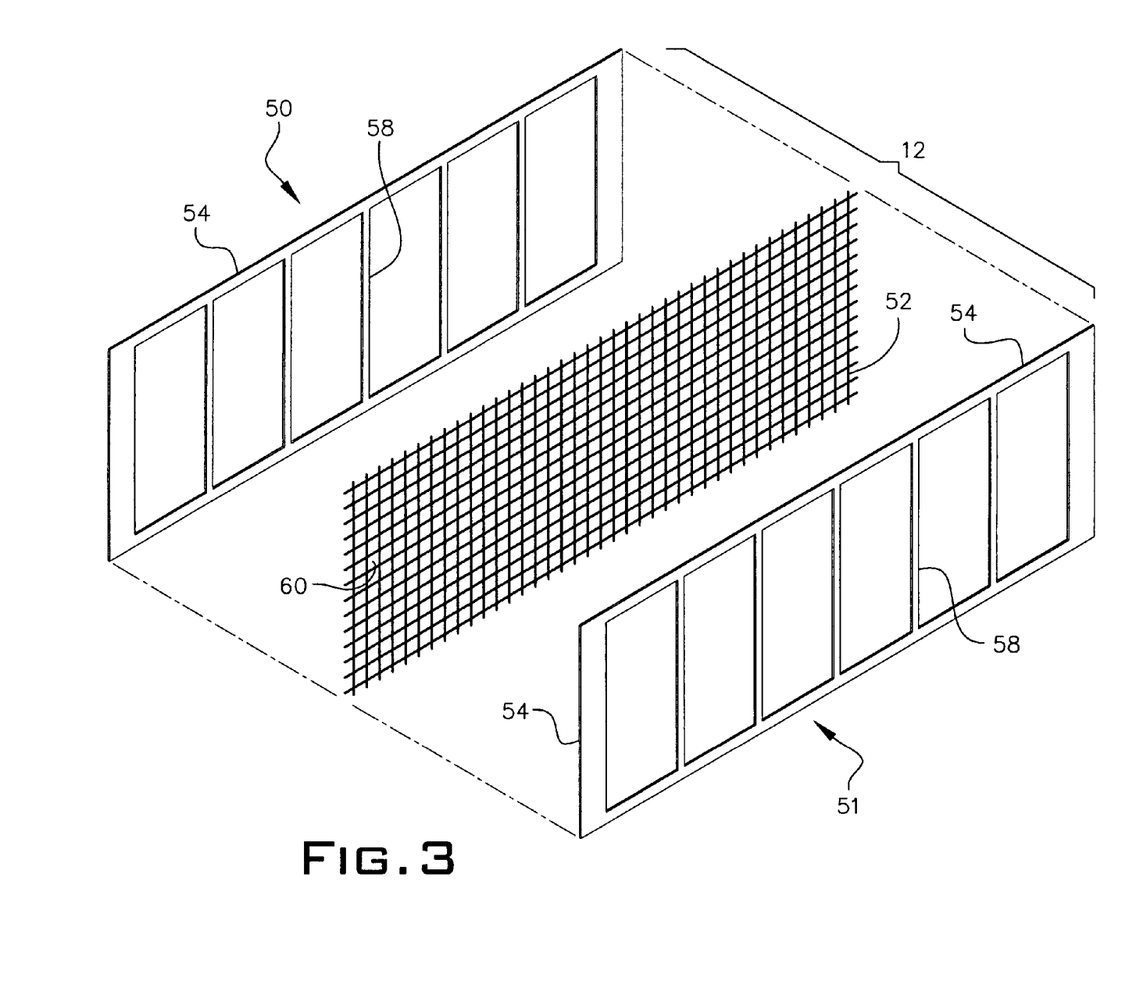
FIG. 3 is an exploded view of one of the grid sections viewed in FIG. 2 showing the outer frames and inner filter media of a grid section.

Referring to FIG. 3, each grid section 12 is formed of two grid section frames 50 and 51 with filter media 52 of stainless steel cloth or polymer mesh encased between the two grid section frames 50 and 51. The grid section frames 50 and 51 are preferably made of stainless steel. The perimeter 54 of the frames 50 and 51 is joined with multiple vertical bars 58. The perimeter 54 and the vertical bars 58 fit through the link slots 24. The filter media 52 is made preferably of stainless steel cloth, or alternatively of polymer mesh or perforated stainless steel plate, with openings 60 ranging from 0.25 mm to 25 mm in diameter; preferably of one millimeter for entrapment of small particles, i.e. pine needles, textile threads, hair, seeds. Alternatively, filter media 52 with openings 60 at the larger end of the range are interchanged within the same grid section 12 for removal of larger debris. Grid sections 12 range in vertical height from four to twelve inches, with six inches preferred. The range of space between vertical bars 58, and subsequently between links 14 on each grid section 12, is ½ inch to five inches with three inches preferred.

Figure 9:
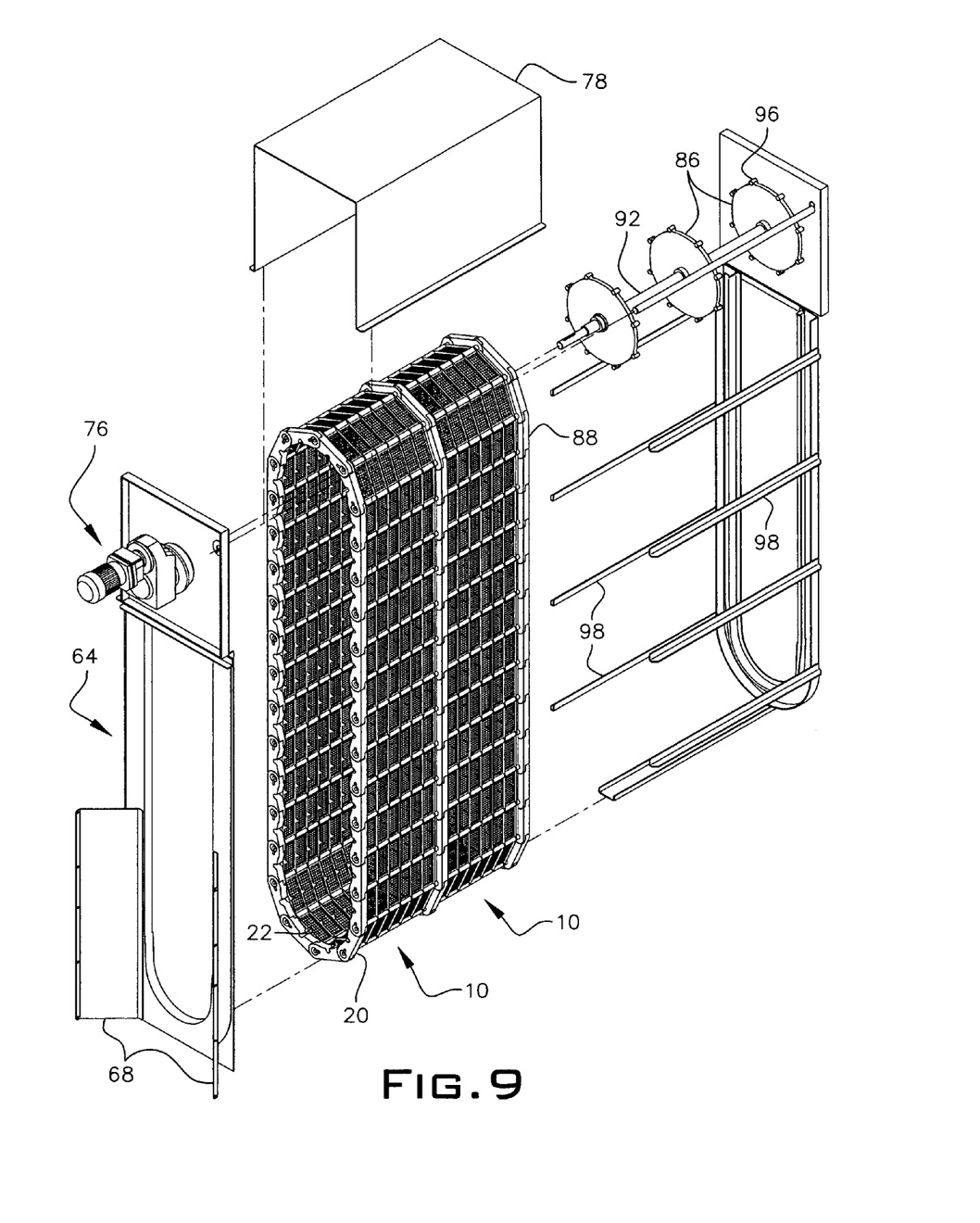
FIG. 9 is an exploded view showing two grid assemblies side by side.
Figure 12:
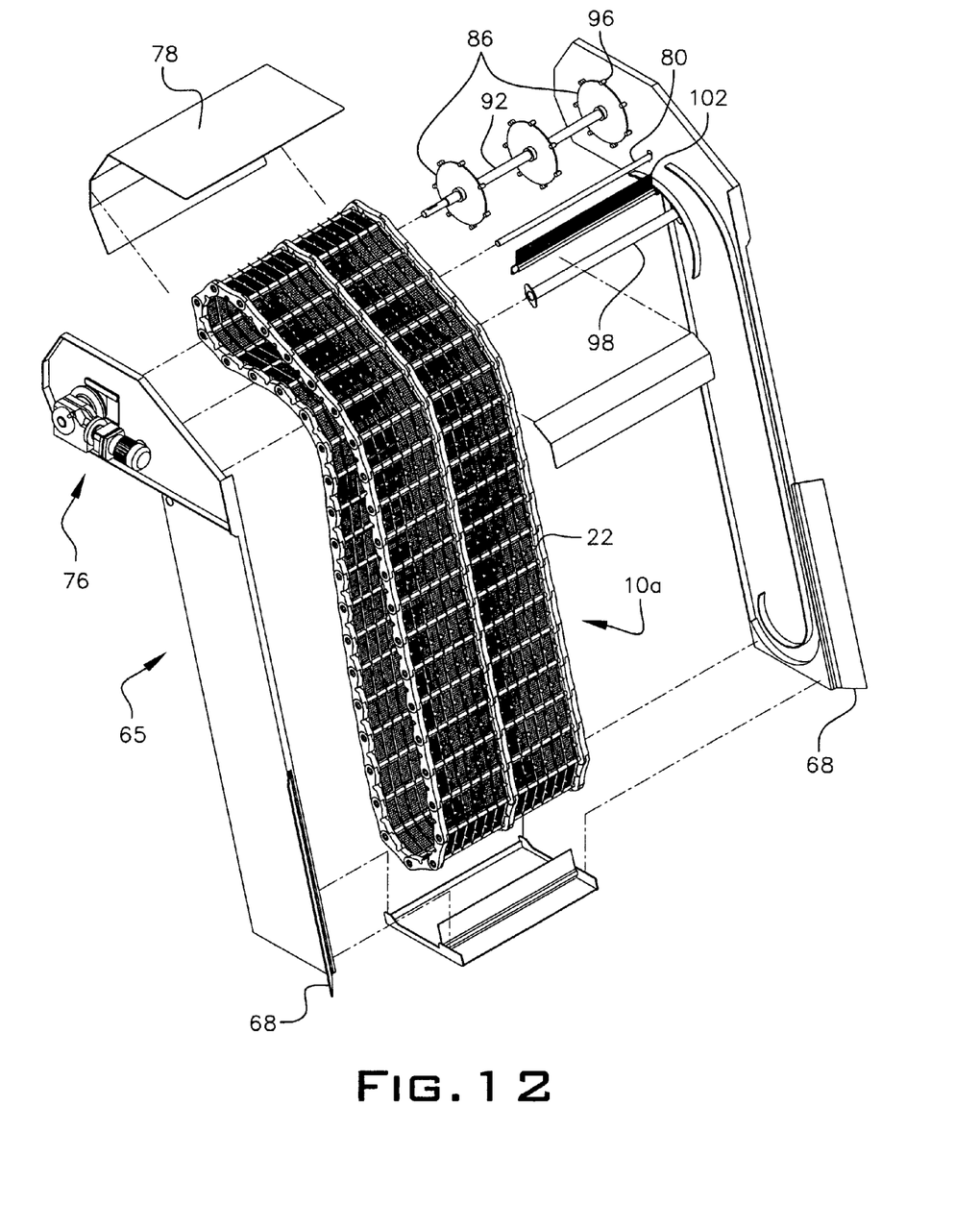
FIG. 12 is an exploded view showing two grid assemblies side by side in the frame structure of FIG. 10.

Debris contained within the influent, whether particles larger than 0.5 millimeters or smaller, i.e. pine needles, textile threads, hair, seeds, are entrained on the surface of the grid sections 12. Links 14, with the spikes 22, capture larger particles. In one embodiment, one or more catch shelves 62 attached to the spikes 22 as shown in FIG. 4 are used to entrain larger particles. One or more adjacent grid assemblies 10 or 10a, are used in a filter apparatus 106 or 106a. Two grid assemblies 10 are shown in FIG. 9 and two grid assemblies 10a are shown in FIG. 12. Additional grid assemblies 10 or 10a can be added.

Figure 7:
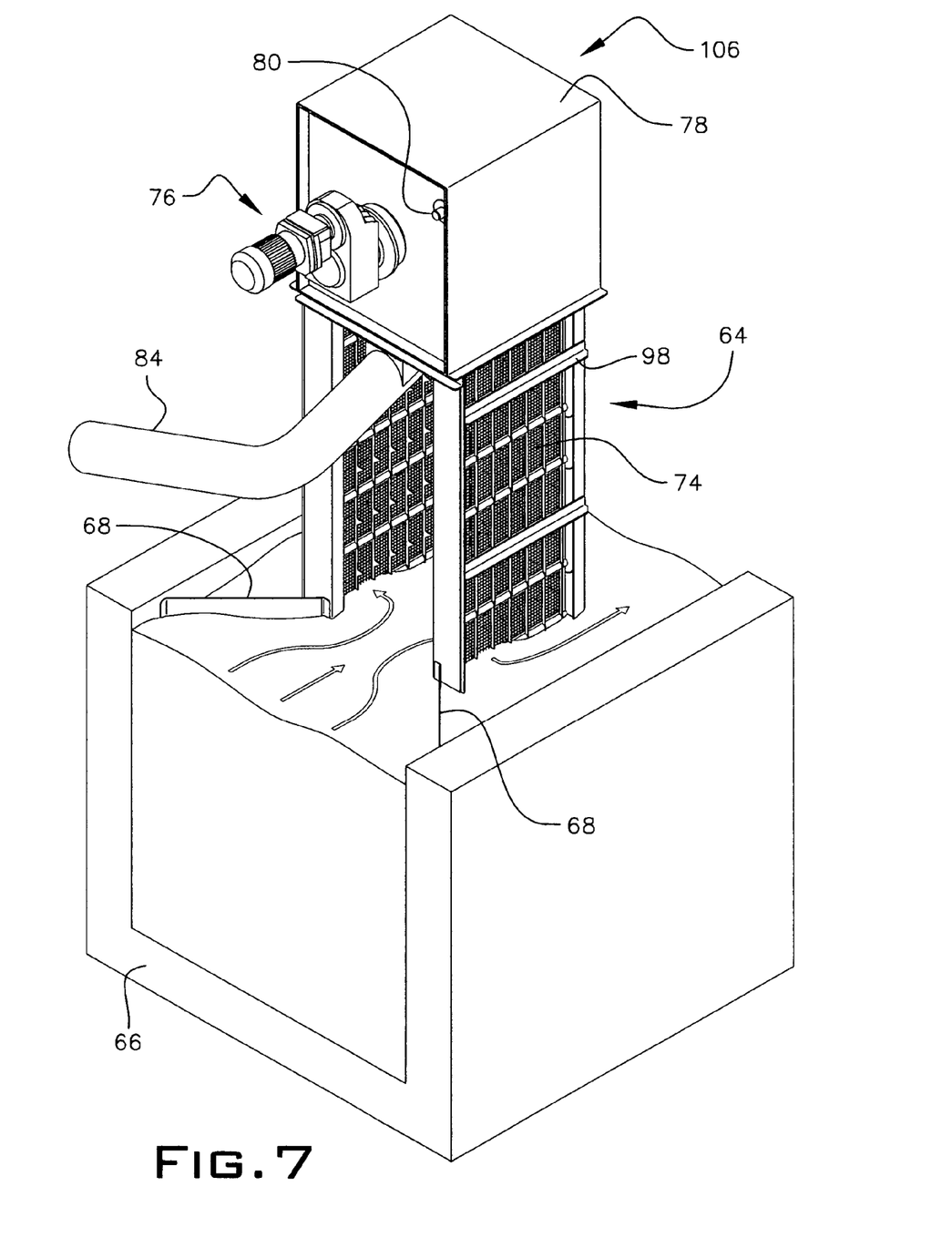
FIG. 7 is a perspective view of the apparatus containing the grid assembly positioned in a stream in one embodiment of the invention.
Figure 8:
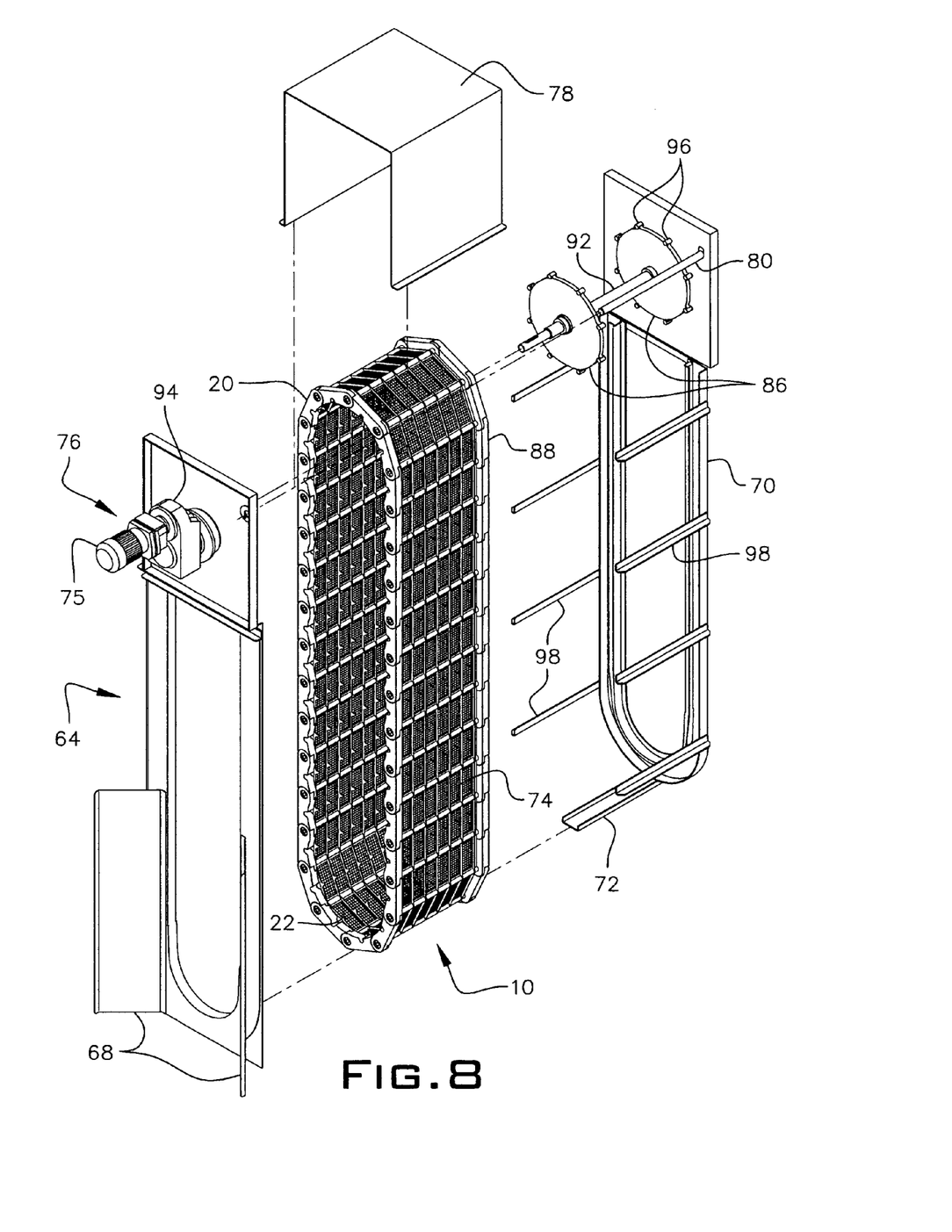
FIG. 8 is an exploded view of the apparatus shown in FIG. 7 with the cover plate removed and showing a grid assembly.
Figure 10:
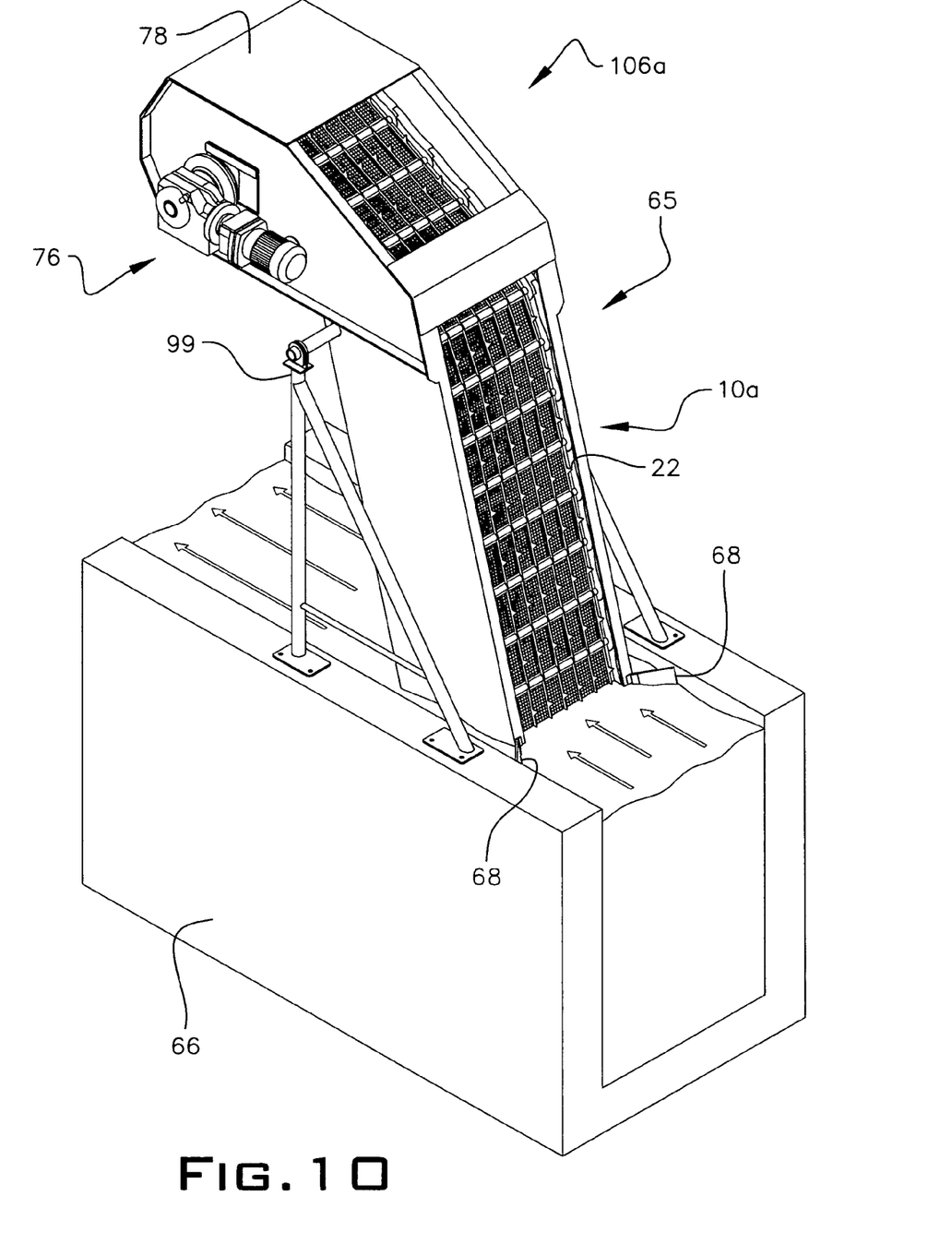
FIG. 10 is a perspective view of the grid assembly in an alternate frame structure.
Figure 11:
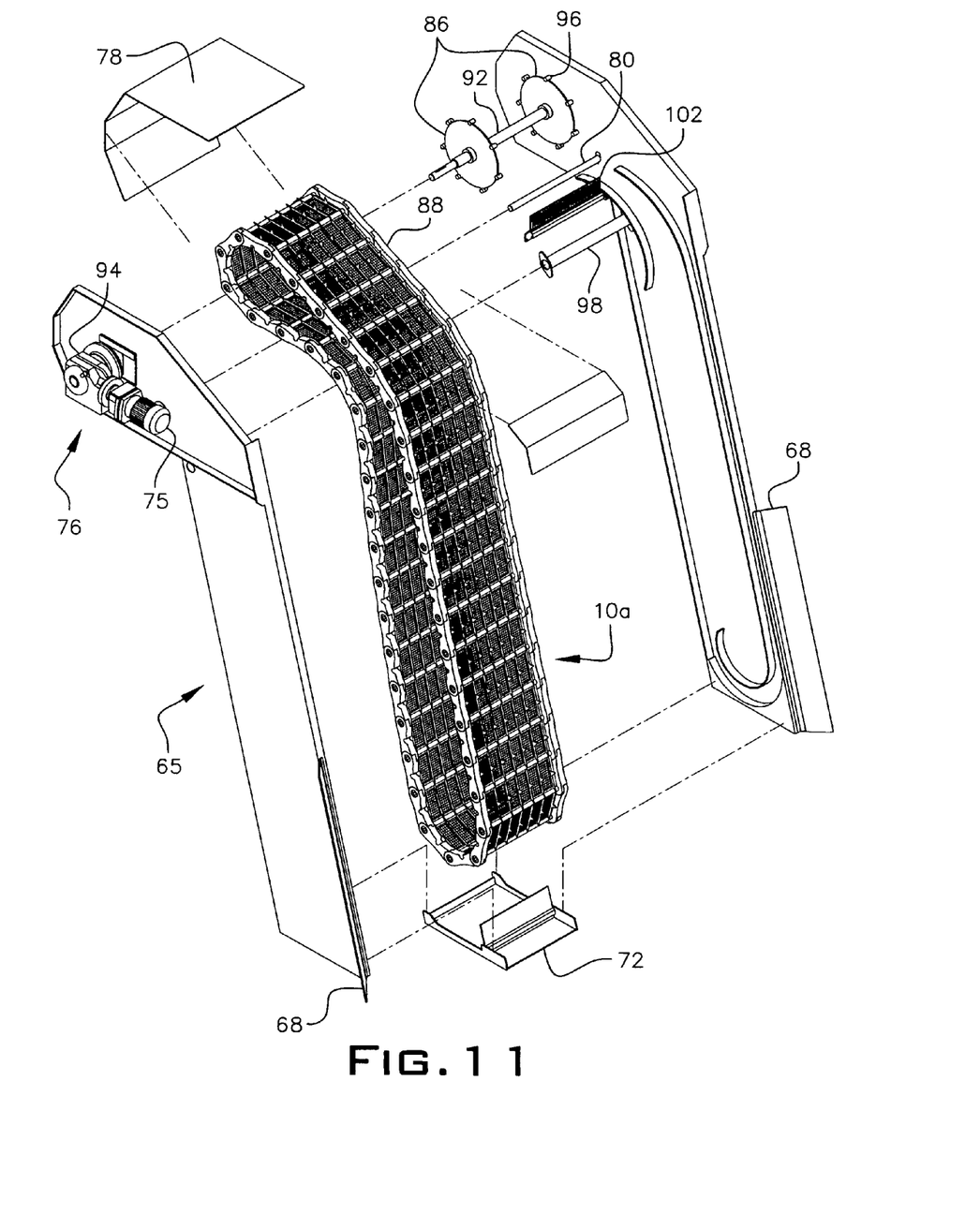
FIG. 11 is an exploded view of the structure shown in FIG. 10 with the cover plate removed and showing a grid assembly.

The filter grid sections 12 mounted in supporting housing frame 64 have the protruding spikes 22 of the links 14 facing inwardly as shown in FIGS. 7, 8 and 9. Alternatively, the filter grid sections 12 are mounted in a supporting housing frame 65 having the protruding spikes 22 of the links 14 facing outwardly as shown in FIGS. 10, 11 and 12. In each embodiment of the filter apparatus 106 and 106a shown in FIGS. 7 and 10, the housing frame 64 or 65 is placed in a tank or channel 66 of influent. Two weirs 68, shown in FIGS. 7-12, are open for water flow through the grid assembly 10 or 10a. In the embodiment shown in FIG. 8, a rear wall 70 deflects the influent so it exits at the bottom 72 or sides 74 of the filter apparatus 106. Alternatively, in the embodiment shown in FIG. 10 the grid assembly 10a faces the influent which flows directly through the grid assembly 10a and out the rear of the apparatus 106a.

The mechanical drive 76, utilizing an electric motor 75 shown in FIGS. 8 & 11, or alternatively hydraulic or pneumatic compression, is attached at the top of the housing 64 or 65 adjacent the top frame 78. A discharge mechanism 80, either a spray wash or air knife, mounted within the top frame assembly 78 unloads the unwanted debris caught between the links 14 on the rotating grid assemblies 10 and 10a into a discharge apparatus 84, either a chute shown in FIG. 7, or alternatively a conveyor (not shown), by which the debris is carried out of the filter apparatus 106 and 106a.

FIG. 8 and FIG. 11 show grid assemblies 10 and 10a engaged by a drive sprocket 86 at each side 88 of the grid assemblies 10 and 10a. A drive gear turns the drive shaft 92 and is connected to a gear reducer 94 that is driven by the mechanical drive 76 mounted near the top of the filter apparatus 106 and 106a. Rotation of the drive elements 20 driven by the drive shaft 92 causes the lugs 96 to engage within the notch 38 of the drive element 20 and causes each grid assembly 10 or 10a to turn. At least two lugs 96 are always in engagement with adjacent drive elements 20 while the grid assembly 10 or 10a is moving.

A horizontal frame support 98 shown in FIGS. 7-9 and FIGS. 11-12 supports the grid assembly 10 within the apparatus 106, while an external frame support 99 shown in FIG. 10 supports the grid assembly 10a within the apparatus 106a. In the embodiment shown in FIG. 11, a cleaning brush 102 sweeps the interior of the grid assembly 10a for self cleaning of the grid sections 12.

The above description has described specific structural details for embodiments of the invention. However, it will be within one having skill in the art to make modifications without departing from the spirit and scope of the underlying inventive concept of this filter grid assembly. The inventive concept is not limited to the structures described, but includes such modifications and equivalents within the knowledge of one having skill in the art.

Having thus described the invention, what is claimed and secured by Letters Patent is:

1. In an apparatus for removing fine particles from a liquid influent, the apparatus having a supporting housing frame containing a rotating filter assembly mounted within an interior portion of the supporting housing frame, the supporting housing frame having an open entrance for receiving the liquid influent together with an exit for the liquid, the rotating filter assembly having at least one endless loop grid assembly, a means for driving the endless loop grid assembly, a discharge device mounted on the housing frame so as to remove the particles from the endless loop grid assembly as the particles reach a designated portion of the housing frame so that entrained particles are removed from the apparatus, the improvement comprising:

(a) the endless loop grid assembly having multiple adjacent removable grid sections, each grid section slidable within a slot in multiple top-to-bottom longitudinally mounted links, the slot in each link of length sufficient to accommodate insertion of the grid section, a substantial number of links having a spike protruding outwardly, each link spaced apart from another link in the grid section, each link mounted on a grid shaft, the grid shaft mounted horizontally within the endless loop grid assembly; and (b) the multiple adjacent grid sections containing filter media with evenly spaced openings, ranging from 0.25 mm to 25 mm in diameter.

2. The improved apparatus of claim 1 wherein the adjacent grid sections are formed by grid section frames encasing the filter media and having multiple vertical bars, each bar aligned with one of the longitudinally mounted links.

3. The improved apparatus according to claim 1 wherein the grid shafts are capped at each end within a drive element.

4. The improved apparatus according to claim 3 wherein the drive elements are made from a high strength polymer.

5. The improved apparatus according to claim 1 wherein the filter media of the grid sections is stainless steel cloth.

6. The improved apparatus according to claim 1 wherein the grid section openings are about one millimeter in diameter.

7. The improved apparatus according to claim 1 wherein the space between the longitudinally mounted links is about three inches.

8. The improved apparatus according to claim 1 wherein the vertical height of each grid section is about six inches.

9. The improved apparatus according to claim 1 wherein a catch shelf is attached to the protruding spikes on the links of multiple grid sections.

10. The improved apparatus according to claim 1 wherein the means for driving the endless loop grid assembly is a mechanical drive powered by an electric motor.

11. The improved apparatus according to claim 1 wherein the means for driving the endless loop grid assembly is a mechanical drive employing an hydraulic system.

12. The improved apparatus according to claim 1 wherein the means for driving the endless loop grid assembly is a mechanical drive employing pneumatic compression.

13. The improved apparatus according to claim 1 wherein there are two adjacent grid assemblies within the apparatus.

14. The improved apparatus according to claim 1 wherein the protruding spikes on the links are facing inwardly in the supporting housing frame.

15. The improved apparatus according to claim 1 wherein the protruding spikes on the links are facing outwardly in the supporting housing frame.

16. An apparatus for removing fine particles from a liquid influent, the apparatus having a supporting housing frame containing a rotating endless loop grid assembly mounted within an interior portion of the supporting housing frame, the supporting housing frame having an open entrance for receiving the liquid influent, a means for driving the endless loop grid assembly, a spray bar device mounted to a top portion of the housing frame so as to flush the particles from the endless loop grid assembly as the particles reach a top portion of the housing frame so that entrained particles are removed unto a discharging chute for conveyance out of the apparatus, the apparatus further comprising:

(a) the endless loop grid assembly having replaceable multiple adjacent grid sections, each grid section slidable within a slot in a vertically mounted link, a substantial number of links having a spike protruding so as to face inwardly toward the interior portion of the grid assembly, each link spaced apart from another link and supported by a grid shaft, the grid shaft capped at each end within a drive element, the drive elements forming an endless loop;

(b) the multiple adjacent grid sections containing a filter media mounted between a front and rear frame; and (c) the adjacent grid sections having vertically spaced apart bars behind each vertically mounted link.

17. The apparatus according to claim 16 wherein the drive elements are made of a high strength polymer.

18. The apparatus according to claim 16 wherein the grid shafts are made of stainless steel.

19. The apparatus according to claim 18 wherein the grid shafts are inserted through polymer spacers to separate the links within each grid section, alternating with polymer washers so as to reduce friction between the longitudinally connected links.

20. An apparatus for removing fine particles from a liquid influent, the apparatus containing an endless loop grid assembly, the grid assembly having replaceable multiple adjacent grid sections, each grid section slidable within a slot in a vertically mounted link, each link having a spike protruding outwardly, each link spaced apart from another link and supported by a grid shaft, the grid shaft capped at each end within a drive element to form the endless loop grid assembly.

21. The apparatus according to claim 20 wherein each grid section has opposing frames enclosing a filter media with openings of 0.25 millimeter to 25 millimeter in diameter.

22. An apparatus for removing fine particles from a liquid influent containing an endless loop grid assembly, the grid assembly having replaceable multiple adjacent grid sections, each grid section slidable within a slot in a vertically mounted link, each link having a spike protruding outwardly, a catch shelf attached to the protruding spikes on the links of multiple grid sections, each link spaced apart from another link and supported by a grid shaft, the grid shaft capped at each end within a drive element to form the endless loop grid assembly.

23. An apparatus for removing fine particles from a liquid influent containing an endless loop grid assembly, the grid assembly having replaceable multiple adjacent grid sections, each grid section slidable within a slot in a vertically mounted link, a substantial number of links having a spike protruding outwardly, each link spaced apart from another link and supported by a grid shaft, an end cap located between a drive element and a corresponding grid section so that the grid shaft is capped at each end within the drive element to form the endless loop grid assembly.

24. An apparatus for removing fine particles from a liquid influent, the apparatus having a housing frame supporting a rotating endless loop grid assembly, the housing frame having an open entrance for receiving the liquid influent, a discharging device mounted to the frame so as to discharge the particles from the endless loop grid assembly for conveyance out of the apparatus, the apparatus further comprising:

(a) the endless loop grid assembly having replaceable multiple adjacent grid sections, each grid section slidable within a slot in a vertically mounted link, each link having a spike protruding so as to face outwardly toward the exterior portion of the grid assembly, each link spaced apart from another link and supported by a grid shaft, the grid shaft capped at each end within a drive element, the drive elements forming an endless loop;

(b) the multiple adjacent grid sections containing a filter media mounted between a front and rear frame; and (c) the adjacent grid sections having a vertically spaced apart bar behind each vertically mounted link.

* * * * *